United States Patent [19]

Reimers et al.

[11] Patent Number: 5,297,328
[45] Date of Patent: Mar. 29, 1994

[54] THERMOFORMING MANUFACTURING PROCESS FOR GOLF BAGS

[75] Inventors: Eric W. Reimers; Jonathan T. Rose, both of Missoula; Allen D. Slagell, Florence, all of Mont.

[73] Assignee: Sun Mountain Sports, Inc., Missoula, Mont.

[21] Appl. No.: 953,545

[22] Filed: Sep. 29, 1992

[51] Int. Cl.$^5$ .................... B23P 11/02; B68G 7/00; A63B 55/02

[52] U.S. Cl. ......................... 29/450; 29/91.1; 29/458; 29/DIG. 29; 29/DIG. 44; 206/315.5; 206/315.8

[58] Field of Search .............. 29/91.1, 91, 448, 450, 29/451, 458, DIG. 24, DIG. 29, DIG. 44; 206/315.2–315.8; 264/46.4, 46.5, 46.6, 46.7; 156/71, 72

[56] References Cited

U.S. PATENT DOCUMENTS

| | | | |
|---|---|---|---|
| 3,559,709 | 2/1971 | Seibold | 206/315.8 |
| 3,941,398 | 3/1976 | Nelson | 206/315.4 X |
| 4,107,829 | 8/1978 | Urai et al. | 29/91.1 |
| 4,404,243 | 9/1983 | Terpay | 156/71 X |
| 4,767,001 | 8/1988 | Kim | 206/315.8 X |
| 4,874,448 | 10/1989 | Urai | 29/91.1 X |
| 5,177,845 | 1/1993 | Meiller et al. | 29/91.1 |

FOREIGN PATENT DOCUMENTS

| | | | |
|---|---|---|---|
| 254609 | 5/1963 | Australia | 206/315.4 |
| 653650 | 12/1962 | Canada | 206/315.5 |
| 2521121 | 8/1983 | France | 29/91.1 |

*Primary Examiner*—Peter Dungba Vo
*Attorney, Agent, or Firm*—Michael J. Hughes; Bradley T. Sako

[57] ABSTRACT

A thermoforming manufacturing process is provided for creating modular three dimensional objects, particularly golf bags (10). The process includes preparatory steps of preparing a corresponding female mold member (42) for each of the golf bag segments (74) to be included, and preparing a laminate sheet material (44) having a fabric surface (46) to give the bag (10) the look and feel of a fabric of bag. Thermoforming steps including edge securing the sheet (44), softening with heat, drawing into the female mold member (42), cooling and removing the formed segment (74) are then performed. Finally, the segments (74) are assembled together to form the golf bag (10). Closed cell foam is the preferred thermoformable and shape retentive material with a woven stretchable fabric providing a preferred surface.

13 Claims, 4 Drawing Sheets

THERMOFORMING MANUFACTURING PROCESS FOR GOLF BAGS

TECHNICAL FIELD

The present invention relates generally to methods of manufacture of elements having exterior shells and more particularly to processes for manufacturing golf bags. The predominant current usage of the process of the present invention is in connection with golf bags having pliable, but semi rigid sides and pockets. The golf bags manufactured according to the inventive process are also a part of the invention.

BACKGROUND ART

Millions of golfers throughout the world use a golf bag to contain, display and transports their golf clubs. With a relatively few exceptions, clubs are always transported around a course, and from the home to the course, in a golf bag. The bags come in a wide variety of shapes and sizes but are ordinarily characterized as tubes having an open end to receive the shafts of the golf clubs, with the heads protruding outward for identification, selection and removal by the golfer, or the designated representative, such as a caddie.

Most golf bags are intended, at least nominally, to be carried on the shoulder of the golfer or caddie, at least part of the time. Even those bags which are specifically intended for use with a cart device, such as Applicant's own invention, the Anacart ® bag described in U.S. Pat. No. 4,796,752, are also intended to be at least marginally comfortable when carried by the shoulder strap. Although some bags are constructed for almost no shoulder carrying, such as those which are integrally constructed with wheel members, most have at least some thought and purpose directed at the comfort of the carrier, as well as the structural integrity of the resulting bag.

Golf bags have been constructed of a wide variety of materials and in a plethora of configurations. Traditional top of the line bags have been made of leather or hide from exotic animals while low end bags have been constructed of canvas and, more recently, of waterproof materials such as vinyl and synthetic fabrics such as nylon. These materials have shared the characteristics of resistance to tearing and weather and at least some pliability to provide comfort. Recently, in some cases, rigid materials such as hard plastics have been used to construct golf bags. There are even some persons who use metal, wooden or plastic open frames to carry clubs, with no exterior shell at all.

If it is assumed that the golf bag is to have a shell portion and is to be carried on the shoulder at least a part of the time, it is imperative to consider the effect of the shape and the material of the bag as these factors affect the comfort of the person doing the carrying. For this reason a great deal of inventive effort has gone into the particular shapes utilized, especially in relation to the body shape of the human being. Further, substantial effort has gone into selecting appropriate degrees of pliability and surface characteristics of the selected exterior shell material to provide comfort as well as structural integrity. Of course, durability, appearance, manufacturing ease and economics are also important.

A technique which has been utilized to give comfortable and attractive surface characteristics while maintaining good structural integrity has been to use interior reinforcing rods (such as in U.S. Pat. No. 4,796,752, discussed above, or to utilize a semi-rigid interior shell, as shown in the inventor's prior U.S. Pat. No. 33,203, and embodied in the Eclipse ® golf Bag distributed by Sun Mountain Sports of Missoula, Montana. These methods have limitations in that they limit the bag shape somewhat to easily formed shapes and also can be less than ideally comfortable to the user, especially over protracted carrying conditions, or when the straps are not properly adjusted for the user's body shape.

There always remains room for innovations in the comfort, aesthetic appeal, structural integrity, volume to weight ratio, and durability of the golf bag. Golfers continually demand improvements and stylistic changes. The ability to construct functional golf bags with lessened limitations on specific shapes and materials is therefore a significant goal.

However, none of the prior art construction methods have successfully solved all the problems relating to flexibility of shape selection, semi-rigid structural integrity combined with comfortable pliability, exterior appearance and maintenance and ease and economy of manufacture.

DISCLOSURE OF THE INVENTION

Accordingly, it is an object of the present invention to provide a method of manufacture for a golf bag which is applicable to a very great variety of shapes and sizes of bags.

It is another object of the present invention is to provide a golf bag manufacturing process which is repeatable and uniform in the predominance of the steps.

It is still another object of the present invention to provide a golf bag which retains its shape indefinitely while having some pliability.

It is a still further object of the invention to provide a method for creation of a golf bag which permits forming complex shapes with sufficient material memory to retain the shapes during use.

It is still another object of the present invention to provide a method which is applicable for constructing golf bags in a wide variety of shapes and configurations.

It is another objection of the invention to provide a golf bag which may be waterproof and have other characteristics of plastic bags, while retaining the aesthetic appearance of fabric.

Briefly, a preferred embodiment of the present invention is a process for thermoforming a variety of individual components for an overall golf bag structure and then combining the various segments together to form an integral golf bag. The method is characterized by utilizing thermoforming techniques of closed cell foam materials laminated to have fabric surfaces on one side thereof, to create a pliable but semirigid structural material having the appearance of a fabric, and thus being unrestricted as to actual exterior appearance. The golf bags created by the process of the present invention are also included.

The process is accomplished in a variety of steps. Those steps are in three general classifications; preparatory, thermoforming and assembly. The initial steps are preparatory and may be accomplished at remote time and location from the remaining steps. The first preparatory step is to prepare a female mold member corresponding to each golf bag segment which is to be utilized. The second preparatory step is to prepare the specific laminate sheet section from the closed cell foam materials and the fabric materials, with the sheet section being cut to the appropriate size for later use.

Once the preparatory steps have been completed the thermoforming steps are individually performed for each golf bag segment. In the first thermoforming step, the laminate sheets are edge secured in position with respect to the mold, then heated to melt the foam and to make the laminate sheet material pliable. Subsequently, the heated and pliable sections are drawn into the mold utilizing vacuum pressure and are formed to the shape of the interior outline of the mold. Once the shape is achieved the molded sections are cooled under the maintenance of continued vacuum and finally removed from the mold structure.

The bag segments which are created are then subjected to assembly steps. In the first step, the thermoformed segments are modified and augmented as necessary, such as by adding zippers, snaps and the like. The final assembly step is to combine the segments by such methods as riveting, sewing or welding into the integral golf bag unit.

The golf bags manufactured according to the process of the present invention can exist in a wide variety of shapes, sizes and configurations. However, the preferred embodiment is a large high capacity "staff" bag which is intended for primary use as other than a lightweight golfer toted bag, as in a bag which is carried by a caddie or placed upon a mechanized cart. Bags manufactured according to the inventive process of the present invention are particularly amenable to having sculptured appearance, a large number of pockets and other detailed luxury and convenience features.

An advantage of the present invention is that the manufacturing process allows for configuration of golf bags in complex shapes and contoured configurations without sacrificing structural integrity.

Another advantage of the present invention is that the manufacturing process allows the utilization of structural materials in the nature of closed cell foam while retaining the appearance of fabric.

Yet another advantage of the present invention is that the small, highly contoured features, such as pockets, retain their shapes over very long periods of time and a variety of use conditions.

Still another advantage of the present invention is that the manufacturing process permits excellent repeatability and minimizes human error.

A still further advantage of the present invention is that three dimensional components may be created separately and utilized in a variety of circumstances.

Still another advantage of the present invention is that pockets and other bag components formed utilizing the thermoforming process maintain their shapes regardless of the contents, and thus making it easier for the user to find individual items therewithin.

Yet another advantage of the present invention is that the use of the thermoformed fabric-foam laminate material as a structural material results in high capacity bags of extremely light weight.

A still further advantage of the present invention is that complex shapes may be formed without puckering or wrinkling.

Yet another advantage of the present invention is that the individual segments are capable of being formed to deal with specific problems, for example the stitching lines on each of the segments may be inset below the surrounding surface, thus reducing the potential for abrasion and the like.

Yet another advantage of the present invention is that the manufacturing process minimizes the necessity to perform cutting and separating processes on material, thus reducing equipment wear.

A still further advantage of the present inventive process is that the golf bags manufactured thereby have a "feel" of pliable natural padding and are comfortable to the individual doing the carrying, particularly in carrying against the person's ribs.

These and other objects and advantages of the present invention will become clear to those skilled in the art in view of the description of the best presently known mode of carrying out the invention and the industrial applicability of the preferred embodiments, as described herein and as illustrated in the several figures of the drawing.

BEST MODE OF CARRYING OUT THE INVENTION

The best presently known mode of carrying out the invention is a process for manufacturing golf bags which are large and have a large capacity but yet which are relatively light and comfortable to carry. The process then utilizes similar manufacturing techniques to form each of the component segments (parts) of the golf bag and then into final assembly to complete the finished product. The process is designed specifically for utilization with materials having the property of being stretchable and deformable under the application of heat and vacuum but which retain their shapes after cooling. The materials are also selected to be at least somewhat deformable so as to be comfortable when in use.

The inventive process includes preparatory steps which are performed individually for each several component segments of the eventual golf bag, and a group of thermoforming segment formation steps which must be performed for each individual segment to be manufactured. The process also includes final assembly steps which may be separated in time from the others in which various of the individually formed component segments are joined together into a combined golf bag.

Figure 1:
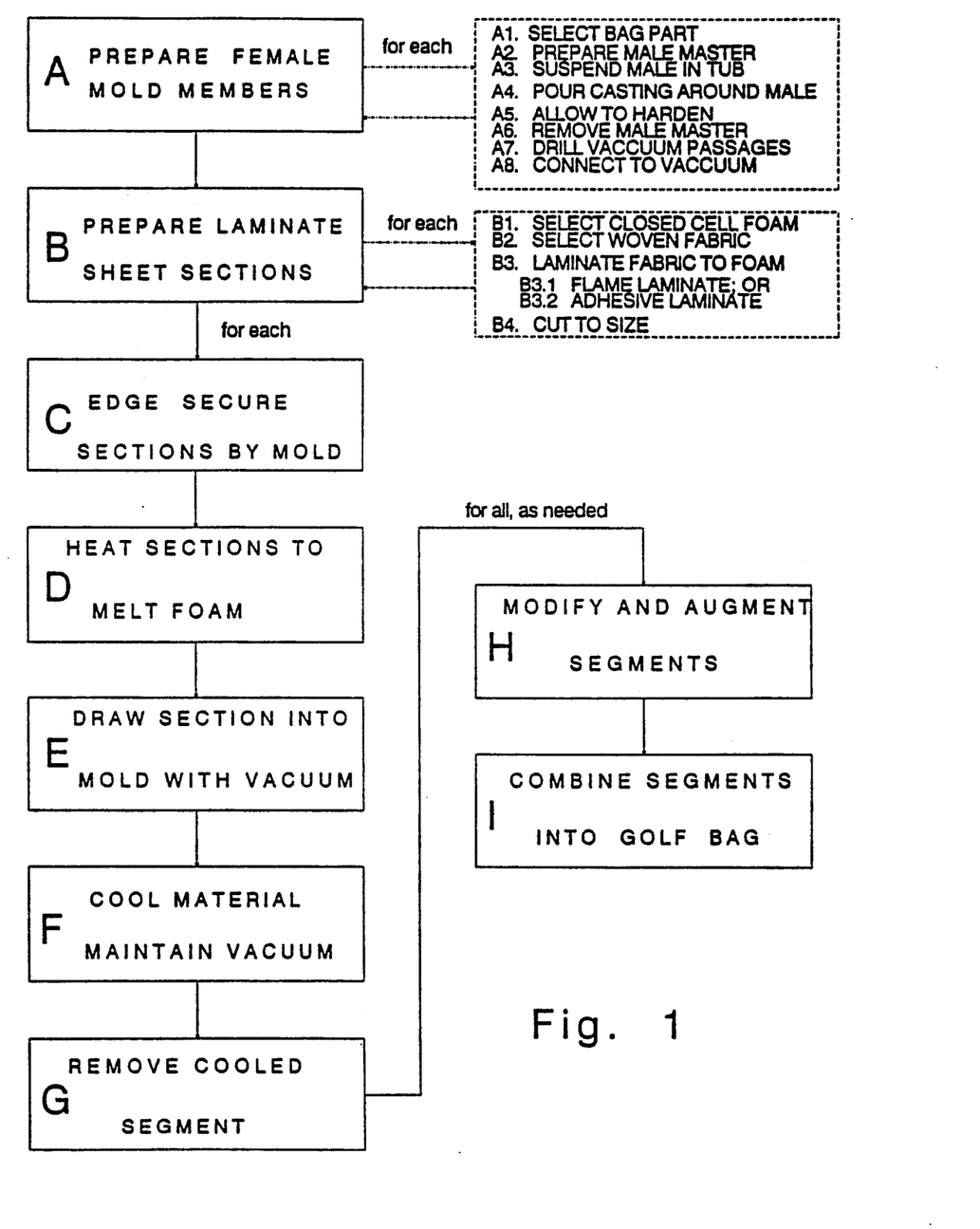
FIG. 1 is a flow chart of the process of the preferred embodiment of the present invention.

The process of the present invention, in an overall broad sense is illustrated in FIG. 1 as a series of specific steps, some of which include substeps. In the illustration of FIG. 1, steps A and B would constitute preparatory steps and steps H and I would constitute final assembly steps. Thus steps C through G represent the central thermoforming steps of the process which would be commonly performed with respect to each of the segments of the golf bag which are to be assembled in H and I. The preparatory steps A and B may be removed in time from the central manufacturing steps. Similarly, the assembly steps H and I may also be substantially removed in time from the manufacturing steps. Timing is significant only in the thermoforming steps C through G.

Figure 2:
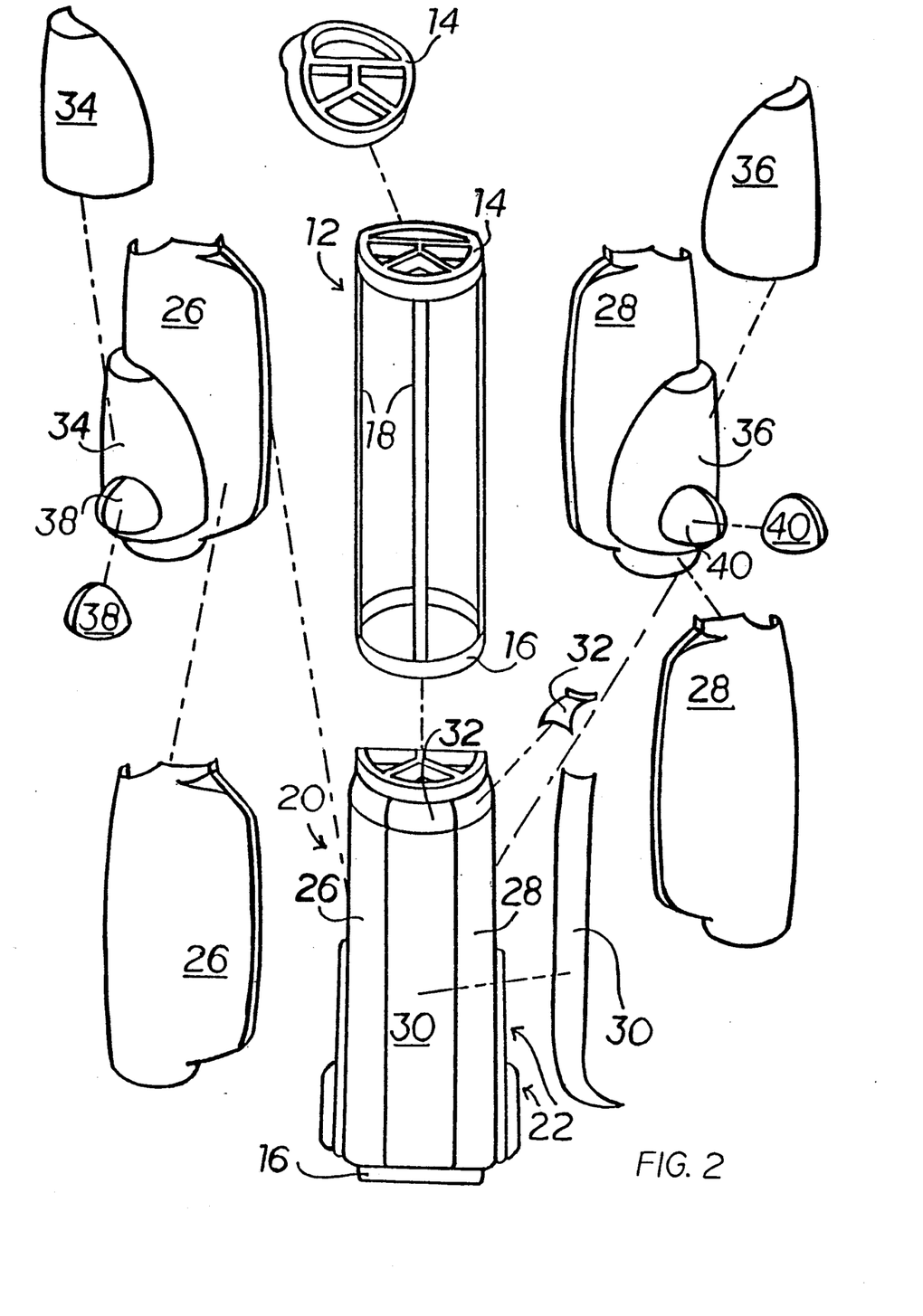
FIG. 2 is a fanciful exploded front perspective view of a "staff" type bag constructed in accordance with the process of the present invention, illustrating some components multiple times for purposes of achieving understanding.

In order to understand the process of FIG. 1, it is helpful to refer now to FIG. 2 which is a fanciful exploded perspective view of a golf bag manufactured according to the present invention, with the component parts thereof being shown as (multiple) explosions from the central golf bag. In the illustration of FIG. 2 the golf bag constructed of thermoformed segments, according to the present invention, is referred to by the general reference character 10. The overall golf bag 10 includes a variety of components and segments, most of which are thermoformed in accordance with the present invention.

However, there are some portions of the golf bag 10 which are previously known. Foremost among the conventional components are an interior frame 12 which includes a molded plastic collar member 14, a molded plastic base member 16 and a plurality of relatively rigid longitudinal stays 18. The interior frame 12 provides interior support for an exterior shell 20 and a variety of pockets 22 preformed thereon, each of the components of the shell 20 and the pockets 22 being thermoformed in accordance with the present inventive process.

The interior frame is in accordance with the inventor's prior U.S. Pat. No. 4,796,752. The overall golf bag 10 further includes accessories such as a carrying strap and a carrying handle (not shown) which are conventional and which are attached to the shell 20. Other accessories such as zippers, stand legs, and the like are also feasible and will frequently be present in the final golf bag 10, but do not form a part of the present invention.

In the illustration of FIG. 2, several of the components of the golf bag 10 are illustrated multiple times, with essentially every component appearing at least twice and some appearing three times. For example, the collar member 14 appears as a portion of the overall golf bag 10 in the lower center of the drawing, as a portion of the interior frame 12 in the center of the drawing and as a separate component above and to the left of the interior frame 12. It is understood that only one actual collar member 14 will be present in the actual golf bag 10. The multiple illustration technique is utilized merely for the purpose of showing the manner in which the various component segments fit together to form the overall complete golf bag 10.

In the front perspective view of FIG. 2 it may be seen that the overall golf bag 10 is symmetrical about a vertically bisecting plane. The view is from the front, so the spine of the bag, in the rear, where the handle and strap would be attached, is not visible in FIG. 2. Since these features are conventional in construction, and do not form a portion of this invention, the lack of illustration does not affect the description.

The shell 20, which does form a portion of the invention, includes, in the preferred embodiment 10, a left body panel 26 and a right body panel 28 which are mirror images of each other. The left body panel 26 and the right body panel 28 are adapted to intersect at the spine of the bag and to be secured together at that portion, typically by stitching, riveting or welding. Furthermore, each of the body panels 26 and 28 is secured to both the collar member 14 and to the base member 16 so as to be held in position. In the front of the bag, however, the body panels 26 and 28 do not converge to a meeting point. Rather, a pair of pocket panels are provided to span the gap. These panels are referred to as a front panel pocket 30 and a tee pocket 32.

The front panel pocket 30, which will also include an interior liner formed of a fabric, or the like, will be secured to each of the side panels 26 and 28 by a zipper or a similar accessory 24 and will provide a location in which large elongated items can be stored. The front panel pocket 30 is designed to be relatively high in volume and is basically formed by the shape of the overall bag creating a volume exterior to the cylinder formed by the interior frame 12.

The tee pocket 32 is a much smaller pocket which is situated directly above the front panel pocket 30 and is adjacent to the collar member 14. The tee pocket 32 is also enclosed by a zipper and a lining and is adapted for holding small items such as golf tees, to which rapid access during usage is desired.

Toward the rear of the bag 10, each of the body panels 26 and 28 are adapted to receive additional pockets for storage of golfing equipment. Directly attached to the body panels 26 and 28 are a left belly pocket 34 and a corresponding right belly pocket 36. The left belly pocket 34 includes an indentation to receive a left ball pocket 38 while the right belly pocket 36 includes a similar indentation to receive a corresponding right ball pocket 40. The belly pockets 34 and 36 are adapted to receive medium/large items, such as clothing and shoes while the ball pockets 38 and 40 are adapted to retain golf balls for ready access.

The "staff" bag shown in the illustration of FIG. 2 is merely one type of golf bag which can be manufactured in accordance with the present invention, but is a preferred form of bag which is particularly useful when constructed of lightweight pliable materials which maintain substantial structural integrity. It is particularly notable that items such as the belly pockets 34 and 36 and the ball pockets 38 and 40 retain their shape and will open readily for visual as well as manual access regardless of the extent of the content. A typical problem in ordinary bags such as those constructed of nylon or canvass is that the pockets tend to collapse when empty, thus limiting access. The thermoformed processing of the present component avoids this.

Figure 3A:
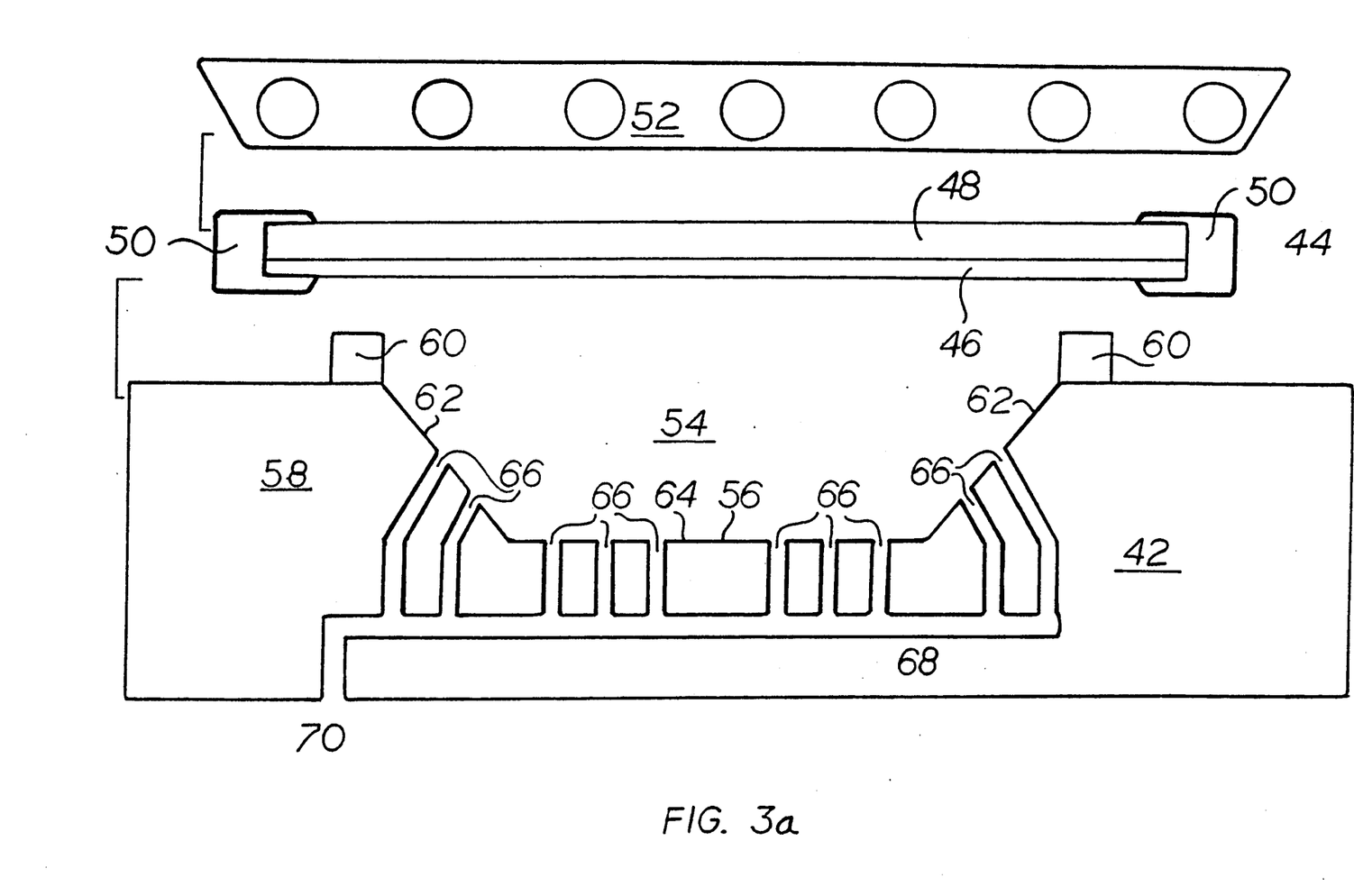
FIG. 3a is a cross sectional view showing the components used in the process as of forming one of the bag segments, as the components exist just prior to the application of the vacuum.
Figure 3B:
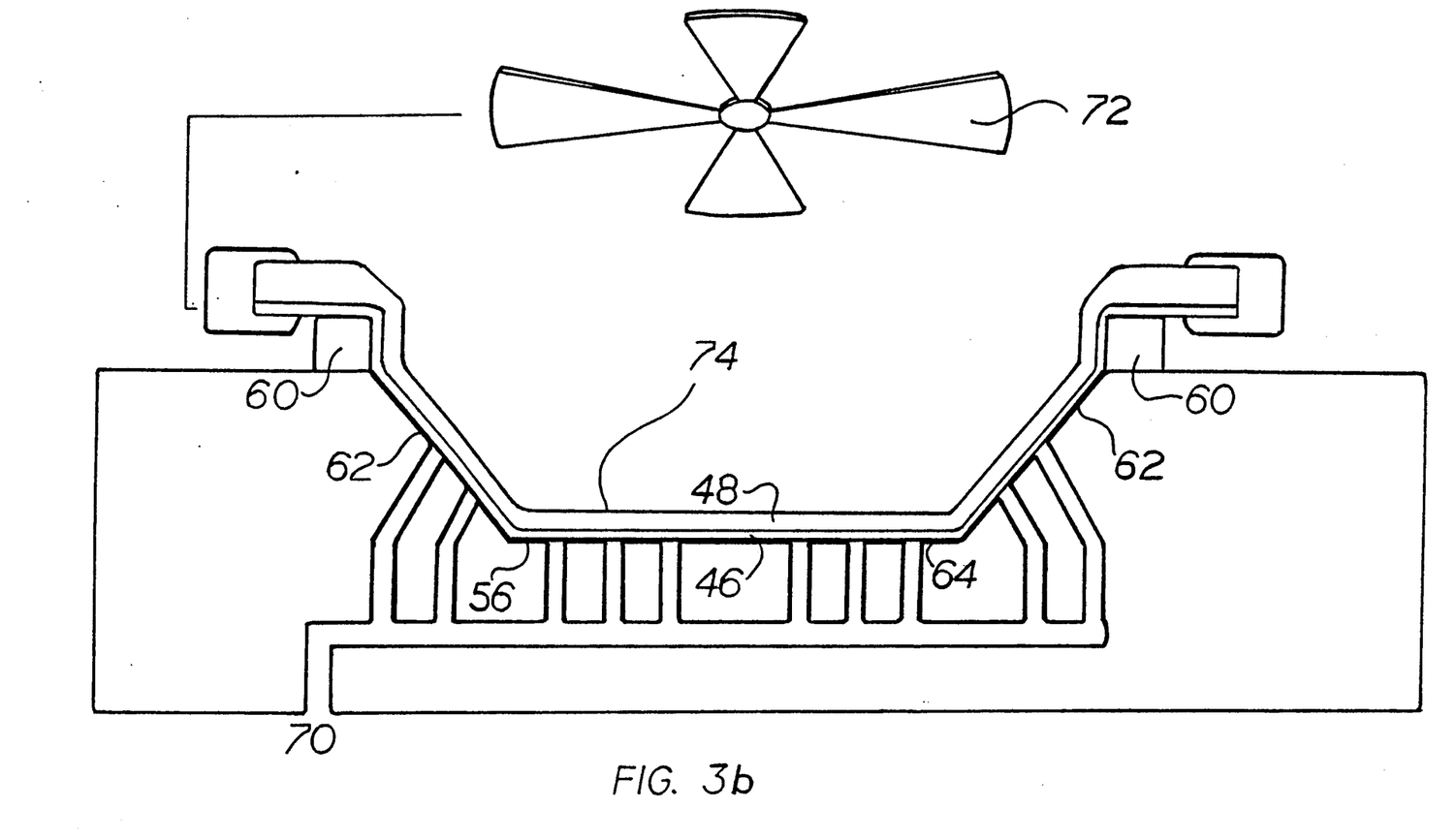
FIG. 3b is a cross sectional view, similar to that of FIG. 3a, showing the system after vacuum application.

FIGS. 3a and 3b illustrate, in similar cross sectional views, the physical elements utilized in the inventive process. The necessary interaction between a female mold member 42 and a laminate sheet section 44 is shown at different two different times during the process as will be discussed hereinafter. The selected times are during Step D of FIG. 1, the heating of the foam (FIG. 3a) and during Step F of FIG. 1, the cooling under vacuum (FIG. 3b). These will be discussed in order in the subsequent treatment of the process steps.

Referring again FIG. 1, it may be seen that the preparatory step of step A, that of preparing a specific female mold member 42 for each of the bag segments, includes a plurality of substeps. The particular substeps are not necessarily critical to the invention but are found to be appropriate for the preferred embodiment.

The step of preparing the female mold members 42 includes substep A1, that of selecting the particular bag part to be molded. If, for example, one of the ball pockets 38 is selected then step A2, that of preparing a male master of the bag segment would be undertaken to form an exterior outline conforming to the shape of the exterior of the ball pocket 38. The male master would be constructed of some material such as wood and would have an exterior shape conforming exactly to that of the desired segment, in this case the ball pocket 38, which would have a flat face with a contoured side panel extending completely about the face, with the degree of extent of the side panel differing from the rear to the front of the bag 10, as is best seen in FIG. 2.

Once the male master has been prepared in substep A2, and has been treated with a mold releasing agent, it is then suspended in a tub or other fluid container in substep A3. Substep A4 then involves pouring a casting material, typically an epoxy, into the tub to fully surround the male master. The release agent prevents the casting materials from adhering to the male master. In substep A5 the casting material is allowed to harden and in substep A6 the male master is removed, leaving the casting in a female mold form.

In order to further prepare the female mold member 42 for usage it is necessary to drill or otherwise form vacuum passages within the mold and to connect the vacuum passages in substep A8 to an external vacuum source. A plurality of vacuum passages are formed in substep A7 in order to achieve the application of sufficient vacuum pressure to the interior of the female mold member 42. By way of example only, for the preparation of a bag segment such as a belly pockets 34, approximately sixty vacuum passages 68 will be formed connecting to the interior surface of the female mold member, with the apertures 66 the end of the vacuum passages 68 being approximately 0.1 centimeter in diameter (0.045 inch). It is noted that the illustration of FIG. 3 is decidedly not to scale, and the vacuum passages 68, at least at the vacuum apertures 66 where they intersect the interior surface of the female mold member 42, are much narrower than illustrated. The number of the vacuum apertures 66 within a particular female mold member 42 will vary depending upon the depth of the mold member and the complexity of curvage required. This will ordinarily be determined empirically during usage, since it is possible to provide additional apertures after initial construction of the mold member, if necessary.

The second major preparatory step, which is independent in time from the preparation of the female mold member 42, is the preparation of the laminate sheet sections 44 for molding into each of the bag part segments. This process will be accomplished for each of the bag segments involved, although for segments of similar size and shape this step may be indistinguishable from one segment to another.

The subprocesses involved in preparing the laminate sheet section 44 include substep B1, that of selecting an appropriate closed cell foam material for utilization. The inventors have determined that a closed cell foam material is most appropriate for the process, given current material availability. Closed cell foam is desirable in that it is airtight and is thus amenable to vacuum thermoforming, is heat deformable at relatively attainable temperature and will flow while retaining its essential characteristics. Furthermore, closed cell foams have good shape retention characteristics subsequent to thermoforming. It has been found that cross-linked materials, and especially irradiated cross-linked polyethylene, make the best materials. A four pound density material has found to be the most appropriate. The particular closed cell foam material which the inventors have found appropriate for the present application is referred to as chemical XL and is available from Illig Industries, Inc.

The substep of step B2 is the selection of a woven fabric to laminate to the closed cell foam to form the integral laminate sheet section 44. An appropriate fabric must be amenable to stretching in all dimensions. For this purpose it has been found that a four to eight ounce weight of a circular knit fabric of one hundred percent (100%) nylon is the most appropriate. Various colors and patterns can be selected at the discretion of the user.

Once the closed cell foam has been selected in substep B1 and the woven fabric has been selected in substep B2, the foam and fabric are then combined together into the laminate sheet 44 by laminating the fabric to the foam in a permanent manner. This subprocess of substep B3 may be accomplished by the alternate methods of flame laminating (substep B3.1) or adhesive lamination (substep B3.2). The flame lamination of substep B3.1 is accomplished in conventional manner by slightly melting the one surface of the foam by application of a gas jet flame and then rolling the melted foam and the fabric materials between pinch rollers immediately thereafter, with care being taken to avoid stretching the fabric material prior to lamination. The flame lamination method, which is considered to be preferred by the inventors, provides surrounding bonding on the fibers of the fabric and excellent permanence.

The alternate substep B3.2 of adhesive lamination may be utilized by various adhesives or glue in the form of a meltable powder or some other glue which results in a permanent boding of the fabric to the foam materials. Whichever lamination technique is utilized, it is important that the fabric is not stretched in any dimension prior to lamination so that its entire stretchability is retained for the vacuum thermoforming steps.

Once the lamination has been achieved, the laminate sheet 44 is technically in the form of a large extending sheet which may be transported in rolls or in other sheet transport method. For each golf bag segment, however, it is desirable to perform substep B4 and to cut the laminate sheet section 44 to the appropriate size for suspension over the female mold member 42 and appropriate thermoforming.

The thermoforming processes (steps C through G) are also best understood in terms of FIGS. 3a and 3b, which show the various physical components utilized in the process at two different stages. FIG. 3a is a cross section view showing the components at a point in time intermediate steps C and D of FIG. 1, while FIG. 3b is a similar cross sectional view showing the configuration of the components at a time intermediate steps E and G. As is shown in FIGS. 3a and 3b, thermoforming steps C through G operate utilizing the female mold member 42 constructed in accordance with step A and the laminate sheet section 44 prepared in accordance with step B. Each laminate sheet section 44 is shown to have a fabric side 46 and a foam side 48. During the thermoforming steps the laminate sheet section 44 is supported by an edge support frame 50 with the fabric side 46 facing the female mold member 42. A heater panel 52 is situated directly over the foam side 48 and directly opposite the female mold member 42.

As is shown in the illustrations of FIG. 3a and FIG. 3b, the female mold member 42 includes a mold cavity 54 which bordered by an interior surface 56 of a casting solid 58. A rim portion 60 extends toward the laminate sheet material 44, beyond the extent of the desired golf bag segment. Circumferential side portions 62 and, in the case of female mold member 42 selected for use in forming the ball pockets 38, a relatively flat bottom surface 64 are also provided.

The interior surface 56, both along the side portion 62 and the bottom portion 64, is provided with a plurality of vacuum apertures 66 which are connected to vacuum passages 68 extending through the casting solid 58. The vacuum passages 68 are connected to a vacuum source 70, not shown, which may be used to deliver vacuum to the mold cavity 54.

As is shown in FIG. 3b, at least one cooling fan 72 is provided. The cooling fan 72 is adapted for utilization subsequent to thermoforming to dissipate the heat generated by the heater panel 52 shown in FIG. 3a. FIG. 3b also illustrates that the result of the process is to convert the planar laminate sheet 44 into a contoured thermoformed segment 74.

Returning now to the process steps shown in FIG. 1, it may be seen that the thermoforming steps C through G include edge securing the laminate sheet sections 44 in proximity to the female mold member 42. The laminate sheet section 44 is secured with the fabric side 46 facing into the mold cavity 54 and with the laminate sheet 44 abutting against the rim portion 60 in such a manner as to form a relatively airtight seal.

In step D the areas of the laminate sheet 44 which are opposite the mold cavity 54 are heated by the heater panel 52. In the preferred embodiment, the heater panel 52 is in the form of K Bars formed of steel rods suspended approximately 3.8 cm (1.5 inches) from the foam material. The K Bars are heated to approximately 90° C. (TM 190° F.) and preheating is maintained for approximately five to six minutes to thoroughly soften the foam side 48 of the materials.

Once the laminate sheet 44 has been thoroughly softened by the heating of step D, step E is accomplished by drawing the softened laminate sheet 44 into the mold cavity 54 by vacuum pressure. Since the closed cell foam 48 is essentially airtight the application of a vacuum to the mold cavity 54, by drawing the air out of the mold cavity 54 through the vacuum apertures 66 and the vacuum passages 68 to the vacuum source 70, results in an unequal pressure which forces the laminate sheet 44 against the interior surface 56. The atmospheric pressure on the foam side 48 of the laminate sheet 44 forces it downward and inward such that the fabric side 46 will be drawn into a flush abutment against the side portions 62 and the bottom portion 64 of the interior surface 56 of the female mold member 42. A moderate vacuum pressure provided by the vacuum source 70, (approaching one atmosphere (27 inches of mercury)) has been found to draw the laminate sheet materials 44 into position against the interior surface 56 in approximately five to ten seconds.

Once the abutment with the interior surface 56 has been accomplished, step F is initiated to set the sheet material 44 into its new shape. Step F involves cooling the material while maintaining vacuum pressure. In this step the heater panel 52 is disengaged and the cooling fan 62 is activated to remove the heat from the laminate material 44, which is now no longer in the form of a sheet but is rather is the particular thermoformed segment 74. In the thermoformed segment 74 the fabric side 46 has been stretched substantially in whatever dimensions are necessary to conform to the shape of the mold cavity 54 and the various individual cells of the closed cell foam material 48 have also been elongated in a similar matter. The cooling of step F, which the inventors have found to occur in approximately one to two minutes using ambient air, causes the closed cell material to set in the shape which will then be retained permanently unless it is again heated beyond its melting point.

Once sufficient cooling has been achieved, step G is activated and the cool thermoformed segment 74 is removed from the mold cavity 54. It is then ready for further processing. The thermoformed segment 74 is permanently shaped and has a fabric appearance to the exterior with a semirigid but pliable feel to the segment. It may be stored for utilization at whatever time is necessary and has extremely good durability and resistance to environmental degradation.

Once all of the segments 74 have been created by the thermoforming steps, all that is necessary is to modify and augment those segments which need additional treatment prior to assembly. Typically, a modification and augmentation to be accomplished in step H would be something of the nature of adding a zipper or accomplishing edge trimming or the like in order to facilitate a greater mating with the other segments.

Finally, once all of the individual segments are ready, they are combined into the overall golf bag in the manner illustrated in FIG. 2. Techniques such as riveting, stitching, welding and gluing may be involved for this purpose.

Although the inventive process and the resulting inventive golf bag 10 accordingly to the present invention have been described above in terms of specific structures and materials, many variations on these are possible. For example, a primary reason for selecting the closed cell foam material 48 is because it is airtight and is easily thermoformed, while an open cell foam material would not be amenable to being drawn into the mold cavity 54. However, this difficultly could be overcome by applying some variety of sealant to the foam side 48 prior to applying the vacuum. Open cell foams will demonstrate similar structural characteristics, but will also not be watertight to the extent of the closed cell foams. However, these characteristics can be modified by additional steps and it would be possible to use the thermoformed method of the present invention to accomplish viable golf bag products using an open cell foam material.

Similarly, other fabric materials may be utilized. The circular knit has been to found to allow the greatest degree of stretching while retaining appearance and surface characteristics, but a variety of other knit patterns may also be successful.

Certainly, different methods may be utilized to actually prepare such elements as the female mold member 42, the laminate sheet section 48 and the various operant items, such as the heater panels 52 and the cooling fan 72, but these are all within the range of skill of those familiar with manufacturing techniques.

Those skilled in the art will readily observe that numerous other modifications and alterations of the device, apparatus and method of the present invention may be made while retaining the teaching of the invention. Accordingly, the above disclosure is not intended as limiting. The appended claims are therefore to be interpreted as encompassing the entire spirit and scope of the invention.

INDUSTRIAL APPLICABILITY

The process for manufacturing a golf bag utilizing a thermoforming technique according to the present invention is applicable to the manufacture of a great variety of golf bags. The process is amenable for very uniform manufacture of golf bags which can have sculpted appearances and very good material memory characteristics. The use of combined laminated fabric and foam materials has several advantages. The foam provides excellent structural stability and resilient deformability while the fabric provides excellent visual appearance characteristics and an exterior "feel" which is preferred by many golfers.

The inventive process and the golf bags 10 produced thereby result in substantial economy of manufacture and flexibility of usage. The golf bag may be formed and sculpted into unusual and visually pleasing shapes and large capacity bags may be constructed having a relatively low overall weight. The bags constructed can be comfortable to carry since the resilience of the foam material allows a degree of conformity to the shape of the user's body without adversely affecting the capacity. The process is usable for construction of bags of any size and shape and various component segments of the bag may be interchangeably molded for use in a variety of different overall bag structures.

Since there is a continuing and great need for improved golf bags in the areas of comfort, durability and capacity, a substantial demand exists for golf bags and manufacturing processes such as those of the present invention. It is therefore believed that the present invention will enjoy commercial utility and industrial applicability which are both widespread in nature and long lasting in duration.

We claim:

1. A process for manufacturing a golf bag, comprising:
    a) preparing a plurality of female mold elements, each said mold element corresponding in interior shape, within a molding depression thereof, to a portion of an exterior of a desired resultant golf bag, each said female mold element being provided with a plurality of vacuum apertures in the molding depression, the vacuum apertures being connected to vacuum creation means, each said female mold element further having a rim portion surrounding the molding depression;
    b) preparing a plurality of sections of sheets of thermoformable laminate material, each said section being sized so as to extend over all interior edges of a rim portion of a corresponding said female mold element;
    for each said section of sheet material:
    c) placing said section in a generally planar alignment over the corresponding molding depression and securing a the perimeter of said section at positions on or beyond the rim portion such that the perimeter at least overlaps the rim portion;
    d) heating the portion of said section which overlaps the molding depression to a predetermined temperature condition wherein the thermoformable material becomes a pliable segment which is partially molten;
    e) activating the vacuum creation means so as to rapidly and evenly draw the pliable segment into the molding depression and maintaining the vacuum creation means in operation until the pliable segment corresponds to the shape of the molding depression;
    f) cooling the thermoformable material in the shape corresponding to the molding depression, thereby forming a molded segment having a pliable but effectively permanent configuration; and
    g) removing the molded segment from the female mold element; and
    for the aggregate of all the molded segments:
    h) creating apertures in and applying attachment elements to those of the molded segments where apertures and/or attachment elements are desired; and
    i) securing the molded segments to abutting molded segments and to nonthermoformed golf bag components to form the desired completed golf bag.

2. The process of claim 1 wherein
the heating of step d) is accomplished using heater bars suspended near said section.

3. The process of claim 1 wherein
each of said female mold elements is arrayed during steps d), e), and f) such that the molding depression is open in a vertically upward direction.

4. The process of claim 1 wherein
said sections are formed with a fabric component on a fabric surface thereof, the fabric component being stretchable but resistant to melting at the predetermined temperature; and
in step c), said sections are secured with the fabric surface facing into the molding depression.

5. The process of claim 1 wherein
the thermoformable laminate material includes a plastic layer in the nature of an closed cell foam material and a fabric layer in the nature of a stretchable woven fabric.

6. The process of claim 1 wherein
each said female mold element is formed of hardened epoxy.

7. The process of claim 1 wherein
the attachment elements include zippers, snaps, base members, and collar members.

8. A process for creating a golf bag having a rounded pliable exostructure, the process comprising:
providing a plurality of female mold elements with vacuum apertures;
vacuum thermoforming a plurality of complementary golf bag components from a thermoformable sheet material by securing segments of the sheet material over said plurality of female mold elements, heating the segments of the sheet material, applying a vacuum to the vacuum apertures to draw the segments of the sheet material into said plurality of female elements thereby creating a plurality of complementary bag components conforming in shape to said plurality of female mold elements, removing the segments from said female mold elements, and securing said complementary golf bag components together to form a golf bag structure.

9. The process of claim 8 wherein
the thermoformable sheet material is a laminate having a woven fabric material on one exterior face thereof.

10. The process of claim 8 wherein
the thermoformable sheet material includes a layer of closed cell foam.

11. The process of claim 8 wherein
the complementary bag components are integrated with nonthermoformed components to form the overall bag structure, the nonthermoformed components including the bag collar and receptacle closure elements.

12. The process of claim 8 wherein each of said complementary bag components is formed to include a fabric side, which fabric sides are arrayed during the securing process such that the fabric sides of said component segments form the exterior of the exostructure.

13. The process of claim 8 and further including a supportive infrastructure secured within the exostructure to provide spatial integrity thereto.

* * * * *